July 20, 1954 C. E. HUFFMAN 2,684,454

CONTROL SIGNAL FOR COLOR TELEVISION

Filed Dec. 2, 1947

INVENTOR.

Charles E. Huffman

BY

Charles W. Mortimer

Patented July 20, 1954 2,684,454

UNITED STATES PATENT OFFICE 2,684,454

CONTROL SIGNAL FOR COLOR TELEVISION

Charles E. Huffman, Upper Montclair, N. J., assignor to Allen B. Du Mont Laboratories, Inc., Passaic, N. J., a corporation of Delaware Application December 2, 1947, Serial No. 789,295

6 Claims. (Cl. 315—21)

A method has been employed to transmit color by television using separate channels to transmit simultaneously each of the primary color components to separate screens at the receiver and optically superimpose the separate images thereby produced to form a composite single image.

Due to variations in deflection of the separate scanning paths however difficulty has been encountered in registering corresponding lines in the composite image with sufficient accuracy. The result has been a decrease in the effective resolution of the system.

With the present invention the accuracy of registry of corresponding lines of the separate images is increased so that the effective resolution for a given number of lines is improved.

In carrying out the invention a deviation of the scanning beam from its predetermined path at the receiver produces control signals which operate to restore that beam to said predetermined path in a manner substantially like that described for use with sequential color television in my copending application, Serial No. 789,296, entitled "Control Signals for Sequential Color Television" filed of even date herewith.

A control structure is described in that application which is auxiliary to the light emitting screen which derives from the scanning beam a pulse or pulses when that beam traverses said auxiliary structure. These pulses cause a restoring control signal to be produced whenever the scanning beam departs even slightly from the desired predetermined path.

In the sequential color scanning method described in the above mentioned application, the path of the scanning beam is confined to a predetermined pattern reproducing several colors in a common area.

In one method of effecting simultaneous color television, the composite image is divided into separate images for each of the component primary colors. These images are reproduced separately on different areas and recombined optically.

The purpose of this invention is to provide means for effecting accurate registry of the images by confining the scanning paths in each of the images to predetermined congruent patterns.

In effecting simultaneous three-color television three different areas are scanned. These may be located singly in separate envelopes or may be combined in one envelope.

The method for confining the scanning path when the scanned areas are in separate electron tubes is as described in reference to Fig. 1.

The method is identical for each of the component colors and obviously need not be repeated. It will be understood that the three separate tubes are grouped so as to facilitate optical superposition of their separate primary color images into one multi-color image.

The separate scanned areas and scanning paths may be included in one envelope without affecting the operation of the invention, as is shown diagrammatically in Fig. 2.

The object of this invention is to control the pattern of several scanning paths so that optical projections thereof may be superimposed with improved accuracy of registry.

The scanned patterns may be upon a light emissive area or upon other areas such as a photosensitive mosaic. In the latter case the lines of projection may be regarded as proceeding in a negative or opposite direction between the scanned area and a projection thereof.

The invention may be understood from the description in connection with the accompanying drawing, in which.

Figures 1, 2, 3:
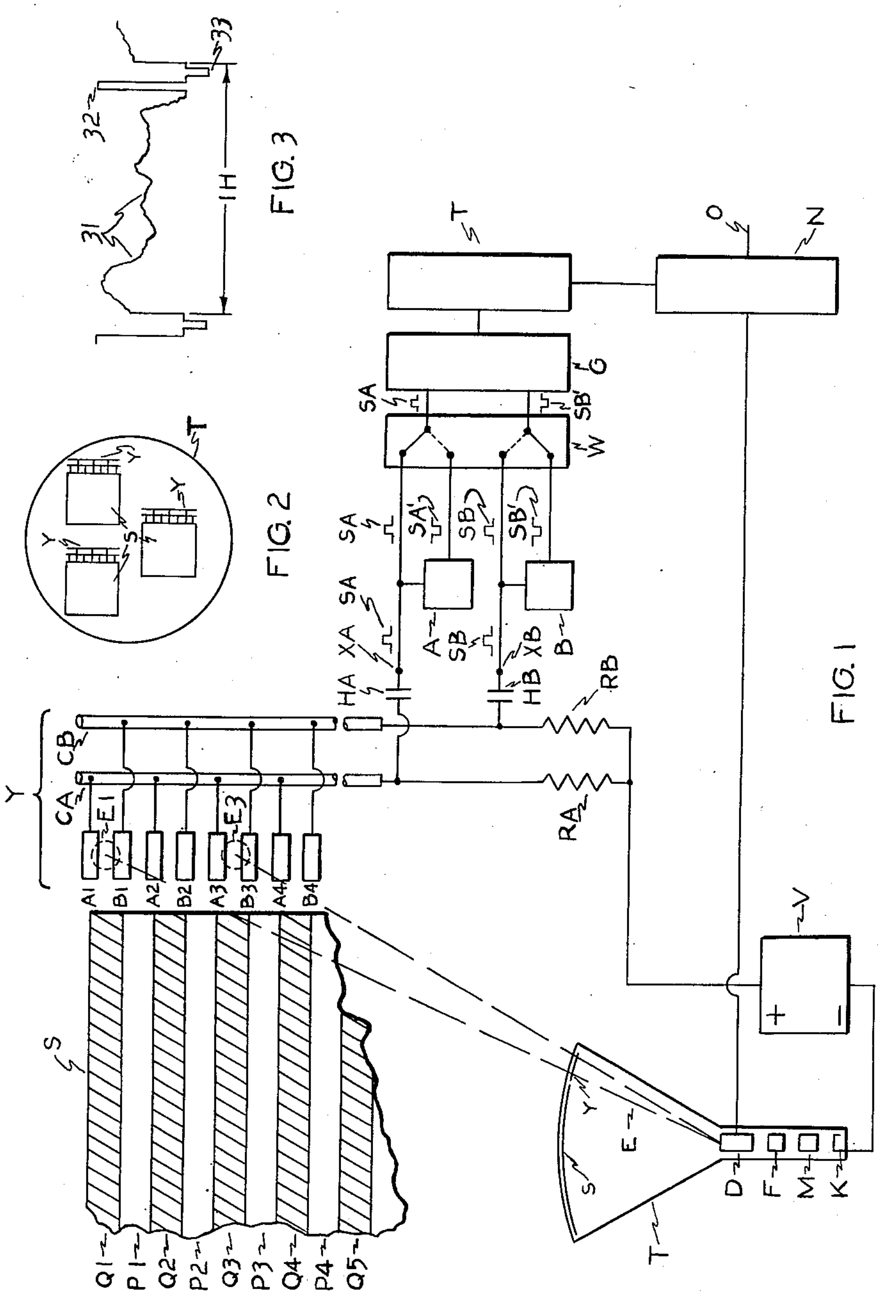
Fig. 1 is somewhat diagrammatic and partly broken away, showing a form of control structure which may be used in carrying out this invention, and also showing its relation to other parts of the control system.
Fig. 2 shows diagrammatically how three different areas and three separate sets of control conductors may be arranged in one envelope so as to be scanned by three separate beams.
Fig. 3 is a diagram showing a preferred type of composite video signal which is suitable for use in operating this invention.

In Fig. 1 of the drawing, reference character S indicates a sufficient portion of the light emitting screen of tube T for an understanding of the invention. The odd numbered lines or odd interlace is indicated by Q1, Q2, Q3, etc. The even lines are indicated by P1, P2, P3, etc.

The strips Q1, etc. and P1, etc. shown in the drawing indicate the locus of the scanning spot across the screen which is not necessarily physically divided into strips as might erroneously be inferred from the drawing.

The control structure Y shown to the right of the screen S is made up of conductors A1, A2, A3, etc. connected to bus CA and interspersed with conductors B1, B2, B3, etc., which are in turn connected to bus CB.

The screen S and the control structure Y are shown in the diagram greatly enlarged to show in greater detail the relationship between them, parts being broken away.

Centers of the "A" conductors are aligned with the tops of the lines Q of the odd interlace; centers of the "B" conductors are aligned with the tops of the lines P of the even interlace.

In the tube T in which the location of the screen is indicated by reference character S and the location of the control structure indicated by Y, the scanning beam E is focussed in the usual manner by means indicated at F all shown diagrammatically. M indicates diagrammatically the beam modulating electrode and K the cathode source of beam electrons. V indicates diagrammatically a source of beam potential that is also well known. RA and RB indicate load resistors, and condensers HA and HB serve to isolate the steady component of beam potential from signal terminals XA and XB, as well as to couple signals from busses CA and CB thereto.

D is a block representing the deflection system of the tube T which is driven by the deflection generator N in the known way. A lead O extends from a source of synchronizing signals, not shown, to this deflection generator N.

The operation may be understood from the following description:

Assume that the beam E is scanning the odd interlace, and therefore the scanning spot E1 traverses only the odd or Q lines, without straying into an even or P line on either side.

As long as this condition holds, the spot E1 as it passes from the end of line Q1 so as to impinge equally on both control electrodes A1 and B1 alters the potential of each by a like amount, as described in my application, Serial No. 789,296, entitled "Control Signals for Sequential Color Television," filed of even date herewith.

These potential changes which are equal are carried over busses CA and CB through condensers HA and HB to signal terminals XA and XB resulting in equal signals SA and SB being delivered to the input of electronic switch W both directly and through inverters A and B. Electronic switch W operates in the known way so as to transmit the reversed polarity of signal SB which has become SB' and also to transmit the unaltered signal SA to the mixer G.

The two equal amplitude signals therefore cancel each other in mixer G and are in effect suppressed so that they do not pass beyond the mixer G. The deflection generator N, which is connected to mixer G through integrator I, is therefore allowed to operate in its usual manner to deflect the scanning beam downward to the next odd interlace line Q2 without altering the deflection rate.

Should some disturbance such as line voltage fluctuation, or some aberration in the deflection system, alter the regular advance of the scanning path of beam E as the spot moves along line Q3 for instance, so as to cause the spot to stray partly into even line P3 below, the spot would traverse the control structure as shown at E3 so as to impinge more on conductor B3 than on A3 thus causing the potential change of B3 to be greater than that of A3 so that the signal on bus CB would be of greater magnitude than the signal on bus CA.

The resulting signal SA then cancels only part of the reversed signal SB' and the uncancelled portion is delivered by mixer G to integrator I so as to act on the deflection control N in such a way as to decelerate the vertical scanning rate and redirect the scanning beam back so as to be wholly within the next odd line Q4 as it enters that line.

The function of integrator I is to extend the effect of the control pulse throughout the succeeding line as previously explained in my application referred to above.

Should the spot tend to depart from Q3 in the opposite direction, the action would be similar but opposite in direction, the resulting greater signal from A3 causing an acceleration in deflection vertically so as to restore the scanning spot to the desired path in a similar way.

The operation is similar during the scanning of the field represented by even lines. It will be noted however that the B conductors are at the top of the scanned lines as the A conductors were during the scan of the odd field.

Therefore at the start of the field of even lines, the electronic switch W is made to reverse the polarity of signal SA making it negative as at SA' and leaving the polarity of the SB signal positive as received over bus CB so that a departure of the spot into a line below the desired one will still result in deceleration of deflection and vice versa.

The operation of this device therefore serves to confine the scanning path to predetermined courses for each interlace and results in more accurate register of lines from separate images on separate screens.

In the preferred type of composite video signal shown in Fig. 3 the signal representing one horizontal scanning line is illustrated. Reference character 31 represents a line of the picture signal, 32 represents a control pulse inserted preferably during the horizontal blanking interval prior to the horizontal synchronizing pulse 33. This control pulse 32 causes the beam current to assume a predetermined value while traversing the control area Y. Therefore the intensity of the beam E, as it traverses the control area, is the same for each line regardless of picture content so that control signals are produced the potential of which varies with the degree of adherence to the proper scanning path.

It is obvious that the light emitting properties of the screen do not enter into the operation of the device and that it may also be employed with the pickup tubes at the transmitter in like manner as disclosed in my application, Serial No. 789,297, entitled "Pickup Device for Color Television," filed of even date herewith.

What is claimed is:

1. In a color television system, an electron tube having a cathode source of electrons, electrodes for accelerating and focusing said electrons and deflecting means for deflecting said electrons, a light translating screen positioned to be scanned by said deflected electrons and having a picture area and a control structure positioned within said tube, adjacent an edge of said screen beside said picture area, in the path of and to be scanned by said electrons, said structure comprising a plurality of conductors connected alternately to two buses leading to the outside of the tube envelope, said plurality of conductors forming pairs, each pair being symmetrically aligned with respective consecutive normal scanning lines of said electrons.

2. The device of claim 1 in which said buses are connected to provide control voltages for controlling the positioning of said scanning lines in accordance with signals produced by said pairs of conductors.

3. A cathode ray tube having a light translating screen having a picture area, an apparatus for scanning said screen with an electron beam, a control structure positioned adjacent an edge of said screen, outside said picture area and within the scanning path of said beam, said structure comprising a plurality of conducting elements arranged in pairs, each pair being respectively aligned symmetrically with the scanning lines of said beam.

4. A cathode ray tube having a plurality of light translating screens each having a picture area and a control structure adjacent one side of each said screen beside each said picture area, an apparatus for scanning said screens and said structures with electron beams, said screens comprising material producing light, each in a different color, and said structures comprising a plurality of conducting elements arranged in pairs, each pair being respectively aligned with the scanning lines of each said beam.

5. A cathode ray tube having a light translating screen having a picture area, apparatus to produce a cathode ray beam for scanning said screen with a plurality of scanning lines and a control area within said tube adjacent one side of said screen beside said picture area in the path of and to be scanned by said beam, and comprising a plurality of conductors forming pairs, each pair being respectively aligned with said scanning lines and being connected to receive current from said beam to control the line scanning position thereof.

6. In a system for producing color television, a cathode ray tube having a plurality of light translating screens each having a picture area, apparatus for producing cathode ray beams for scanning said screens, each with a plurality of scanning lines, each said screen producing light in a different color from the other of said screens and control areas within said tube adjacent each said screen and beside each said picture area, in the path of and to be scanned by said beams, and comprising a plurality of conductors forming pairs respectively aligned with the scanning lines on each said screen and connected to receive current from said beams to control the position of consecutive scanning lines thereof.

References Cited in the file of this patent

UNITED STATES PATENTS

| Number | Name | Date |
|---|---|---|
| 1,976,400 | Ilberg | Oct. 9, 1934 |
| 2,415,059 | Zworykin | Jan. 28, 1947 |
| 2,446,791 | Schroeder | Aug. 10, 1948 |
| 2,518,200 | Sziklai | Aug. 8, 1950 |

FOREIGN PATENTS

| Number | Country | Date |
|---|---|---|
| 443,896 | Great Britain | Mar. 10, 1936 |